Feb. 14, 1928.

I. C. EMMONS 1,659,090

CULTIVATOR ATTACHMENT

Filed May 24, 1926    2 Sheets-Sheet 1

INVENTOR.
Ira C. Emmons,
BY
Geo. P. Kimmel   ATTORNEY.

Feb. 14, 1928.
I. C. EMMONS
1,659,090
CULTIVATOR ATTACHMENT
Filed May 24, 1926
2 Sheets-Sheet 2
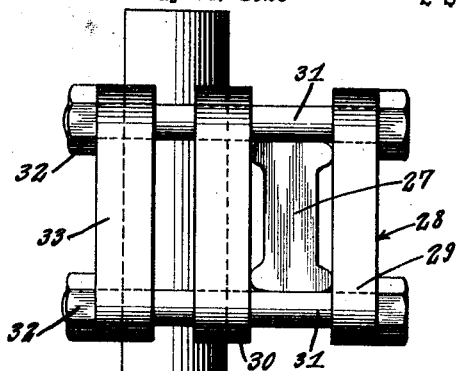
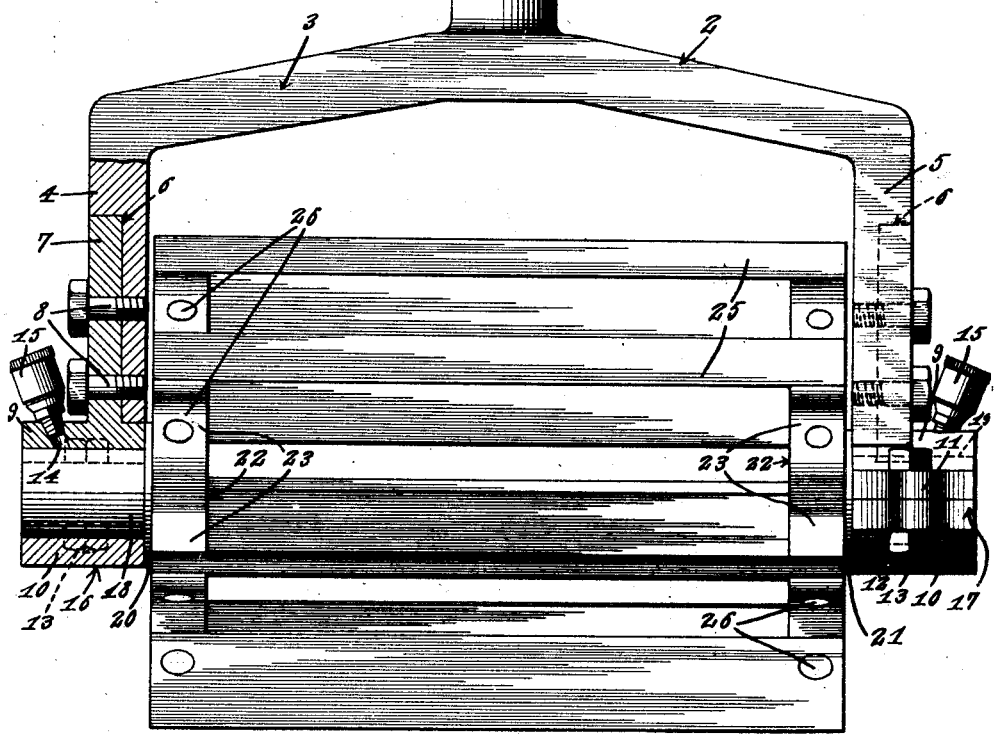
INVENTOR.
*Ira C. Emmons,*
BY
*Geo. F. Kimmel,* ATTORNEY.

Patented Feb. 14, 1928.

1,659,090

UNITED STATES PATENT OFFICE.

IRA C. EMMONS, OF HARDWICK, MINNESOTA.

CULTIVATOR ATTACHMENT.

Application filed May 24, 1926. Serial No. 111,340.

This invention relates to agricultural implements, more particularly to a cultivator attachment, and has for its object to provide in a manner as hereinafter set forth, an attachment of such class including a bodily revoluble set of angularly disposed knives for not only lifting the soil when active, but further operating to chop out the weeds and pulverize the soil without injuring the corn roots, under such conditions providing for a satisfactory cultivating operation.

A further object of the invention is to provide, in a manner as hereinafter set forth, a cultivator attachment including an angularly and vertically adjustable bodily revolvable set of angularly disposed knives for thoroughly cultivating the soil on the revolving of said set of knives, as the set is pulled forwardly by suitable traction means therefor.

Further objects of the invention are to provide, in a manner as hereinafter set forth, a cultivator attachment which is simple in its constructon and arrangement, strong, durable, thoroughly efficient in its use, conveniently installed with respect to a cultivator beam and inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 2 is a front elevation, partly in section, of the attachment.

Figure 1:
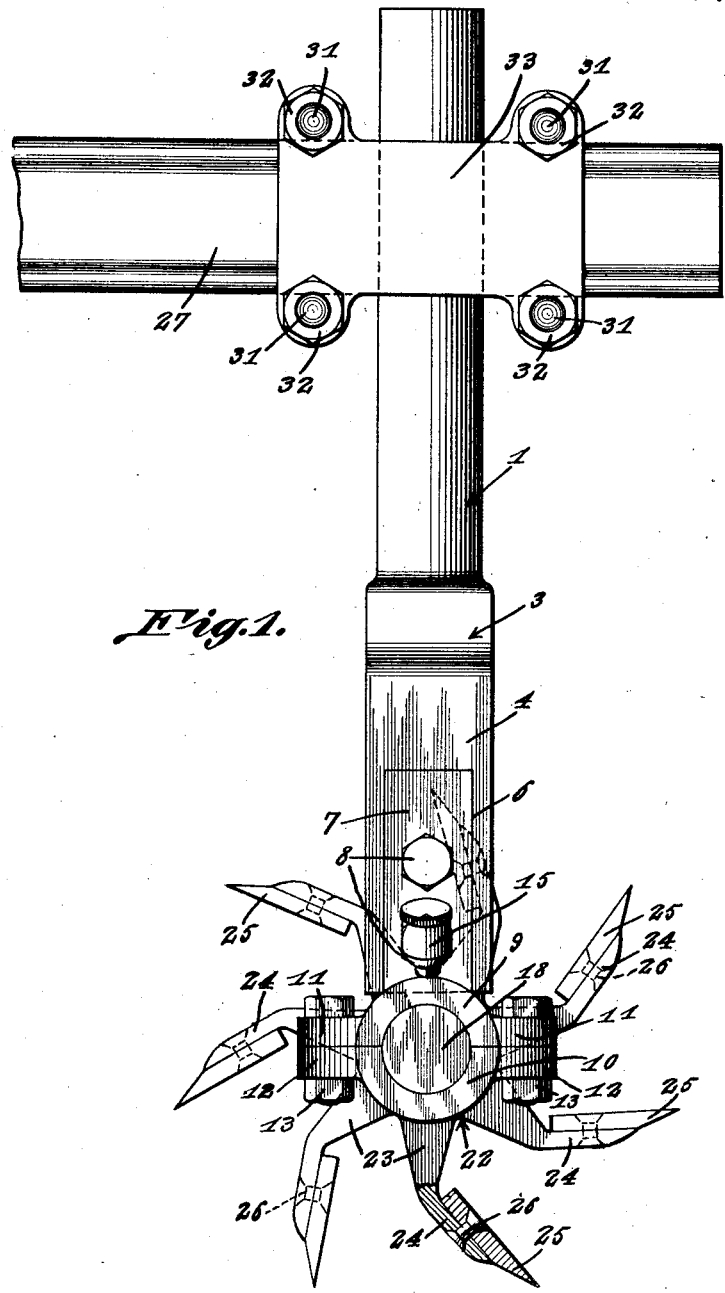
Figure 1 is a side elevation of a cultivator attachment, in accordance with this invention, and further showing the attachment connected with the beam of a cultivator, the beam being broken away.

A cultivator attachment, in accordance with this invention, includes a shank 1 of appropriate length, and which is cylindrical in cross section. The lower end of the shank 1 has formed integral therewith, or suitably connected thereto, an inverted yoke-shaped member referred to generally by the reference character 2. The member 2 includes a top bar 3 and a pair of depending arms 4, 5. The top bar 3 is shown of arch-shape, but it is to be understood that the contour of the top bar 3 can be as desired. The outer side of the arm 4, as well as the arm 5 is formed with a groove 6, open at its lower end and closed at its upper end. The groove 6 extends lengthwise of its respective arm and opens at the lower edge of the arm. The groove 6 provides a pocket for a hanger member 7 and the latter is fixedly secured to the arm 4 or arm 5 by a plurality of hold fast devices 8. The hanger 7 snugly fits the walls of the groove 6 and is provided at its lower end with the flanged upper section 9 of a bearing means. The section 9 has secured against the lower face thereof the lower section 10 of the bearing means. The section 9 is provided with a pair of oppositely extending flanges 11 and the section 10 with a pair of oppositely extending flanges 12. Hold fast devices 13 are employed for securing the flanges of one section to the flanges of the other section and when the sections are secured together a bearing will be provided, see Figure 1. The section 9 is formed with an opening 14 in which is secured a lubricating cup 15 for the purpose of supplying a lubricant to the interior of the bearing.

The bearing which is arranged below the arm 4 is referred to generally by the reference character 16 and the bearing which is arranged below the arm 5 is referred to generally by the reference character 17. Journaled in the bearing 16 is a stub shaft 18 and journaled in the bearing 17 is a stub shaft 19. The inner end of the shaft 18 is provided with a hub 20 and the inner end of the shaft 19 with a hub 21. Each of the hubs is of appropriate width and has formed integral therewith a series of spokes and each of the latter is generally indicated by the reference character 22. Each spoke consists of a radially disposed inner part 23 and an outer part 24 disposed at an obtuse angle with respect to the part 23 and arranged substantially tangentially with respect to the hub 20. The part 24 is disposed at an angle of approximately forty degrees with respect to the part 23. The leading face of each outer part is flat throughout. Each outer part 24 has its free end beveled and with the bevel extending from the outer end of the follower face to the outer end of the leading face of such part. The set of spokes carried by the hub 21 are arranged in alinement with respect to the set of spokes carried by the hub 21. Fixedly secured to the part 24 of each pair of alining spokes is an oblong cutter or knife 25 and owing to the angular disposition of the parts 24 the knives 25 are also angularly disposed. Each knife 25 has its ends flush with the outer side of the two angularly disposed parts 24 to which the knife is secured. Each end of the knife is secured to a part 24 by a hold fast device 26. The forward side of each knife is beveled to provide a cutting edge and with the bevel extending from the forward side of the front of the follower face to the forward side of the leading face of the blade. The forward end of the leading face of the part 24 is flush with the forward side of the follower face of a blade. The width of the blade is substantially the same as the length of the leading face of the part 24 whereby the inner side of the blade is positioned in close proximity to the point of joinder of the part 24 with the part 23 of the spoke. The knives are detachably secured to the parts 24 by the hold fast devices 26. The inner parts or portions 23 of the spokes are of triangular contour or rather taper from their inner ends to their point of joinder with the outer parts 24, and these latter are of rectangular contour and of uniform thickness from their points of joinder with the parts or portions 23 to their beveled outer ends. The knives 25 project a substantial distance from the outer ends of the parts 24, see Figure 1.

The shank 1 is adjustably connected to the cultivator beam 27 by a securing device 28 and which includes a pair of outer and an intermediate clamping plate arranged whereby an outer and an intermediate plate will be clamped against the shank 1 and an outer and an intermediate plate clamped against the beam 27. The outer clamping plates are indicated at 29 and the intermediate plate by the reference character 30. The bolts which secure the plates in clamping position are indicated at 31 and which carry securing nuts 32. The plates are provided with openings 33 for the passage of the bolts. The openings in one plate aline with the openings in adjacent plates. Other means than that as shown can be employed for detachably or adjustably connecting the shank 1 to the beam 27.

The hold fast devices for securing the knives to the part 24 of the spokes have their heads countersunk in the knives to provide a smooth surface on the lifting side of the knives. The shank 1 is adjustably connected to the beam 27 so that it can be raised or lowered or turned and by this arrangement the knives can be elevated and lowered or can be set at any angle desired. As is well known most cultivators have a heavy spring to hold the beam down, and this will cause the knives to enter the depth desired. As the machine moves forward the knives will rotate backwardly and they can be set to throw the soil in the direction that is desired. Preferably the set consists of seven knives, but this number can be increased or diminished if desired, but it has been found that a more satisfactory action is had when the set is set up consisting of seven knives. When cultivating four sets of knives will be used on each singe row cultivator and eight sets on a double row. One set is to be positioned on the front end of beam and one on the back making two on each side of the cultivator. The rotary attachment, that is to say the bodily revoluble set of knives, will not only lift the soil, but will chop out the weeds and pulverize the soil without injuring the corn roots.

It is thought the many advantages of a rotary cultivator attachment, in accordance with this invention, can be readily understood, and although the preferred embodiment of the invention is as illustrated and described, yet it is to be understood that changes in the details of construction can be had which will fall within the scope of the invention as claimed.

What I claim is:

1. A revoluble cultivator attachment comprising a pair of spaced lengthwise alining stub shafts, each having an integral hub at its inner end, a set of spokes integral with each hub and with each of the spokes of each set formed of an inner portion and an outer portion having a flat leading face, said inner portions disposed radially with respect to the axes of said hubs, said outer portions disposed at an obtuse angle with respect to said inner portions and arranged substantially at a tangent with respect to said hubs, the outer end of each of said outer portions being beveled and with the bevel extending forwardly from the outer ends of the follower faces to the outer ends of the leading faces thereof, the spokes of one set opposing and alining with the spokes of the other set, oblong, ground lifting, pulverizing and weed cutting elements positioned against and connecting each pair of opposed outer portions of the spokes together and further projecting therefrom, each of said elements having its forward side beveled and with the bevel extending forwardly from the follower faces to the leading faces of the elements, and the said outer portions having the outer ends of the leading faces thereof flush with the outer sides of the follower faces of said elements.

2. A revoluble cultivator attachment comprising a pair of spaced lengthwise alining stub shafts, each having an integral hub at its inner end, a set of spokes integral with each hub and with each of the spokes of each set formed of an inner portion and an outer portion having a flat leading face, said inner portions disposed radially with respect to the axes of said hubs, said outer portions disposed at an obtuse angle with respect to said inner portions and arranged substantially at a tangent with respect to said hubs, the outer end of each of said outer portions being beveled and with the bevel extending forwardly from the outer ends of the follower faces to the outer ends of the leading faces thereof, the spokes of one set opposing and alining with the spokes of the other set, oblong, ground lifting, pulverizing and weed cutting elements positioned against and connecting each pair of opposed outer portions of the spokes together and further projecting therefrom, each of said elements having its forward side beveled and with the bevel extending forwardly from the follower faces to the leading faces of the elements, and the said outer portions having the outer ends of the leading faces thereof flush with the outer sides of the follower faces to said elements, said inner portions tapering from their inner ends to the point of joinder thereof with said outer portions, and said outer portions being of rectangular contour.

In testimony whereof, I affix my signature hereto.

IRA C. EMMONS.